3,160,597
POLYAMIDES STABILIZED WITH A HALIDE SALT, A PHOSPHORUS COMPOUND AND A MANGANESE OR COBALT SALT
Winston Costain, Manchester, and Harold John Palmer, Pontypool, England, assignors to Imperial Chemical Industries Limited, London, England, and British Nylon Spinners Limited, Pontypool, Monmouthshire, England, both corporations of Great Britain
No Drawing. Filed Nov. 27, 1961, Ser. No. 155,183
Claims priority, application Great Britain, Nov. 25, 1960, 40,626/60
8 Claims. (Cl. 260—21)

This invention relates to synthetic linear polyamides having improved resistance to the destructive influence of exposure to heat and oxygen.

By synthetic linear polyamides we mean polymeric carboxylic acid amides such as may be prepared by polymerising monoamino carboxylic acids or their amide forming derivatives or by polymerising diamines with dicarboxylic acids.

It has already been proposed to improve the resistance of these polyamides to the destructive influence of exposure to heat and oxygen by incorporating with the polyamides a proportion of an alkali metal halide or other inorganic halide together with an oxy compound of phosphorus or a copper compound soluble in the polyamide or a mixture of an oxy compound of phosphorus with a copper compound soluble in the polyamide.

We have now found that synthetic linear polyamides may be effectively stabilised against exposure to heat and to oxygen by the addition to the polyamides of a water-soluble inorganic halide of a monovalent cation or the halide of an organic base, an oxy acid of phosphorus or salt thereof and a salt of manganese or cobalt.

Thus according to the present invention we provide synthetic linear polyamides stabilised against the destructive effects of exposure to heat and oxygen by the incorporation with the polyamide during or after manufacture of a water soluble inorganic halide of a monovalent cation or the halide salt of an organic base, an oxy acid of phosphorus or salt thereof and a salt of manganese or cobalt.

The water-soluble inorganic halides may be for example ammonium, or alkali metal chlorides, bromides or iodides.

The halides of organic bases which may be used as alternatives to the inorganic halides are those obtained from organic bases which can become incorporated into the polyamide molecule without detriment to its stability when the polyamide is exposed to the combined influence of heat and oxygen. Such bases include for example hexamethylene imine, morpholine and substituted morpholines, piperidine and substituted piperidines, pyrrolidines and substituted pyrrolidines open chain aliphatic diamines, piperazine, triethanolamine and the strong organic bases referred to in U.K. patent specification No. 839,067.

The halide is incorporated with the polyamide in an amount such that the halogen ion is present to the extent of from 0.01% by weight to 3.0% by weight of the polyamide; preferred limits are from 0.05% to 1.0% by weight.

It is preferred to incorporate the cobalt and manganese compounds as the salts of carboxylic acids particularly those of the aromatic or aliphatic series containing up to 18 carbon atoms. The salts of aliphatic monocarboxylic acids containing up to about 6 carbon atoms for example acetic, propionic and butyric acids are especially suitable, and also dicarboxylic acids such as adipic, sebacic and dodecane-dioic acids. Other cobalt and manganese compounds for example inorganic salts such as the halides and the phosphates are also suitable.

The nature of the cobalt or manganese salt used to introduce the cobalt or manganese ion into the polyamide melt is of minor importance provided that halide ions and ions of an oxy acid of phosphorus are also present. However, it is found that the salts of cobalt or manganese with carboxylic acids are usually more soluble in the polyamide melt and for this reason are especially convenient to use. The cobalt or manganese compounds are present preferably in amount of from 0.005% by weight to 1.0% by weight of the polyamide.

As oxy acids of phosphorus suitable for incorporation with the polyamides there may be used phosphoric acid in any of its forms or phosphorous acid or mixtures of these acids. The oxy acid of phosphorus is added to the polyamide in amount of from 0.01% by weight to 1% by weight. Alternatively the corresponding salts of the oxy acids of phosphorus may be used in equivalent amounts for example the ammonium or alkali metal salts such as sodium dihydrogen phosphate or the salts with organic bases, such as those already mentioned as suitable for use as the halides.

The invention is illustrated but not limited by the following examples in which parts and percentages are by weight.

*Example 1*

12 parts of 66 nylon polymer delustered with 0.03% titanium dioxide are dissolved in 88 parts of 90% formic acid and 1.0% cobalt oleate, 1.0% potassium iodide and 0.25% sodium dihydrogen phosphate are added and thoroughly mixed with the solution. A film is cast from the solution by flowing out on a glass plate and drying in an oven for ten minutes at 105° C. The film is tested by heating at 225° C. for 30 minutes and shows little discolouration, whereas a film cast from unmodified polymer shows considerable colour development after this test. Similar films containing 0.1% manganese phosphate or 0.1% manganese ammonium phosphate instead of the cobalt oleate similarly show little discolouration on thermal exposure at 225° C. for 30 minutes.

*Example 2*

Polyhexamethylene adipamide containing 0.03% manganese acetate, 1.0% potassium iodide and 0.25% sodium dihydrogen phosphate when exposed to an oxygen atmosphere at 220° C. absorbs oxygen at a rate of 0.071 ml./g./min. compared with a rate of 0.425 ml./g./min. for the unmodified control.

The yarn from this polymer after exposure in air at 220° C. for 30 minutes had a strength retention of 81% compared with 20–30% for control yarns.

*Example 3*

If the manganese acetate of Example 2 is replaced by 0.03% cobalt acetate, the strength retention of the yarn on exposure as above is 78%.

What we claim is:
1. A synthetic linear polyamide having recurring amide linkages in the main polymer chains stabilized against the destructive effects of exposure to heat and oxygen by the incorporation with the polyamide of
    (1) a halide salt selected from the group consisting of water soluble inorganic chloride, bromide and iodide salts of monovalent cations and chloride, bromide and iodide salts of organic bases, said halide salt being incorporated with the polyamide in an amount such that the halogen ion is present to the extent of from 0.01% by weight to 3.0% by weight of the polyamide,
    (2) 0.01%–1% by weight of the polyamide of a member of the group consisting of oxy acids of phosphorus and salts thereof and
    (3) 0.005% to 1.0% by weight of said polyamide of a salt of a member of the group consisting of manganese and cobalt.

2. A synthetic linear polyamide according to claim 1 wherein said halide salt is an ammonium salt.

3. A synthetic linear polyamide according to claim 1 wherein said halide salt is an alkali metal salt.

4. A synthetic linear polyamide according to claim 1 wherein the halides of organic bases are those obtained from organic bases which can become incorporated into the polyamide molecule without detriment to its stability when the polyamide is exposed to the combined influence of heat and oxygen.

5. A synthetic linear polyamide according to claim 1 wherein the cobalt and manganese compounds are incorporated as the salts of a member of the group consisting of fatty acids and dicarboxylic acids.

6. A synthetic linear polyamide according to claim 1 wherein the salt of the oxy acid of phosphorus is an ammonium salt.

7. A synthetic linear polyamide according to claim 1 wherein the salt of the oxy acid of phosphorus is an alkali metal salt.

8. A synthetic linear polyamide according to claim 1 wherein the salt of the oxy acid of phosphorus is a salt of an organic base.

References Cited by the Examiner

UNITED STATES PATENTS

| | | | |
|---|---|---|---|
| 2,705,227 | 3/55 | Stamatoff | 260—45.75 |
| 2,887,462 | 5/59 | Van Oot | 260—45.75 |
| 2,960,489 | 11/60 | Gabler et al. | 260—45.75 |
| 2,984,647 | 5/61 | White | 260—45.75 |
| 2,985,621 | 5/61 | Brandes et al. | 260—45.75 |

LEON J. BERCOVITZ, *Primary Examiner.*

A. D. SULLIVAN, JAMES A. SEIDLECK, *Examiners.*